United States Patent [19] … Fujikawa et al.

[11] Patent Number: 5,061,034
[45] Date of Patent: Oct. 29, 1991

[54] PERMANENT CONNECTOR FOR OPTICAL FIBERS

[75] Inventors: Junji Fujikawa, Yasu; Fumiaki Tamura, Kanzaki, both of Japan

[73] Assignee: Nippon Electric Glass Co., Ltd., Otsu, Japan

[21] Appl. No.: 465,173
[22] PCT Filed: Jun. 30, 1989
[86] PCT No.: PCT/JP89/00664
 § 371 Date: Feb. 26, 1990
 § 102(e) Date: Feb. 26, 1990
[87] PCT Pub. No.: WO90/01175
 PCT Pub. Date: Feb. 8, 1990

[30] Foreign Application Priority Data

Jul. 27, 1988 [JP] Japan .................... 63-188663

[51] Int. Cl.⁵ .............................. G02B 6/26
[52] U.S. Cl. .................................. 385/95
[58] Field of Search .................. 350/96.20–96.22

[56] References Cited

U.S. PATENT DOCUMENTS 4,746,189  5/1988  Arrington et al. ........ 350/96.21
4,784,458 11/1988  Horowitz et al. ......... 350/96.21
4,789,217 12/1988  Mitch ...................... 350/96.21
4,919,510  4/1990  Hoke et al. ............... 350/96.21
4,960,316 10/1990  Berkey .................... 350/96.21

FOREIGN PATENT DOCUMENTS 56-25708  3/1981  Japan .

Primary Examiner—Akm Ullah
Attorney, Agent, or Firm—Armstrong, Nikaido, Marmelstein, Kubovcik & Murray

[57] ABSTRACT

A permanent connector for optical fibers comprises a protective glass tube (2), a capillary tube (1) received therein and eccentrically joined thereto, the two tubes being made of ultraviolet-transmitting glass, and an adhesive-passing groove (1c) formed in the middle portion of the capillary tube (1) and opening on the side opposite to the side where they are joined together. An ultraviolet-curing type adhesive agent is charged into the permanent connector for optical fibers and the ends of optical fibers (3, 4) are inserted thereinto through the opposite ends thereof until the clads (3a, 4a) are butted against each other in the capillary tube (1) while pushing out the adhesive agent and air. And ultraviolet rays are radiated to cure the adhesive agent (6), thereby connecting the optical fibers (3, 4) together.

3 Claims, 1 Drawing Sheet

PERMANENT CONNECTOR FOR OPTICAL FIBERS

TECHNICAL FIELD

The present invention relates to a permanent connector for optical fibers, and particularly to a permanent connector of simple construction for optical fibers with the use of an ultraviolet-curing type adhesive taken into consideration.

BACKGROUND ART

Heretofore, permanent connectors for optical fibers using glass have commonly had a V-shaped groove or a like construction for optical fiber alignment (centering).

Recently, a permanent connector for optical fibers including a glass sleeve in which optical fibers are concentrically butted against each other has been suggested (see Japanese Utility Model Application Disclosure Nos. 61505/1986 and 99806/1986).

In the case where optical fibers are to be butted against each other, the use of a V-shaped groove has a possibility of the ends of optical fibers deviating to the space opposite to the groove, and if this really happens, the connection loss increases.

The conventional permanent connector for optical fibers for concentrically butting optical fibers against each other in a glass sleeve uses a specially shaped single sleeve of nonuniform thickness in order that optical fibers which are each composed of a core having a thickness of about 10 $\mu$m or about 50 $\mu$m and a clad having an outer diameter of about 125 $\mu$m concentrically surrounding said core and which are each covered with a coat having an outer diameter of about 250 $\mu$m or about 900 $\mu$m may be butted against each other. Manufacture of glass sleeves of such shape is very difficult because of their small diameter. And they are low in strength and their nonuniform thickness tends to cause stress concentration and they have no reinforcing construction. Therefore, they have been of little practical use.

DISCLOSURE OF THE INVENTION

In view of the drawbacks of conventional permanent connector for optical fibers described above, the present invention has been accomplished as a result of intensive study, and its object is to provide a permanent connector for optical fibers which can be produced relatively simply and with high accuracy and has sufficient strength and which, using a simple and inexpensive tool, can be operated in an explosion-protected place or a narrow working space for connecting optical fibers safely and quickly and with high accuracy.

To achieve said object, a permanent connector for optical fibers comprises a capillary tube made of ultraviolet-transmitting glass which has an accurately produced inner diameter slightly greater than the outer diameter of the clads of optical fibers, tapered portions on the opposite ends of the inner diameter, and an adhesive-passing groove formed in the middle portion and having a depth which is not more than ½ of the inner diameter, and an ultraviolet-transmitting protective glass tube which has an inner diameter greater than the outer diameter of the capillary tube and to which the capillary tube is eccentrically joined in said inner diameter on the side opposite to the adhesive-passing groove to define a clearance between said inner diameter and the outer diameter of the capillary tube on the side where the adhesive-passing groove is formed.

Further, the permanent connector for optical fibers of the present invention has an ultraviolet-curing type adhesive agent injected thereinto and is wrapped in a light screening packaging material.

The present invention also includes an embodiment incorporating an adapter tube made of ultraviolet-transmitting glass adapted to be applied to optical fibers whose coats have a small outer diameter, said adapter tube having an outer diameter slightly smaller than the inner diameter of the protective glass tube and an inner diameter slightly greater than the outer diameter of the coats of optical fibers, said adapter tube having tapered portions on the opposite ends of said inner diameter.

Since the opposite ends of the inner diameter of the capillary tube are tapered, insertion of optical fibers is facilitated.

The middle portion of the capillary tube is provided with an adhesive-passing groove and is formed with a clearance between the outer diameter of the capillary tube on the side where said groove is formed and the inner diameter of the protective glass tube; therefore, when optical fibers are inserted into the capillary tube from its opposite ends, the remaining air in the capillary tube escapes through said groove and clearance under the piston action of the optical fibers, facilitating the insertion of optical fibers together with the adhesive agent sticking to the connected ends of optical fibers, preventing the remaining air in the capillary tube from remaining in the form of bubbles in the adhesive agent to increase connection loss.

Since the depth of the adhesive-passing groove in the middle portion of the capillary tube is less than ½ of the inner diameter of the capillary tube, the ends of optical fibers butted against each other adjacent the position where the groove is formed ar surrounded by the inner diameter surface of the capillary tube over at least more than half the circumference. Optical fibers can be butted against each other concentrically while retaining the connected end surface of the optical fibers in parallel relation. To give a supplementary explanation, quartz glass tube optical fibers having an outer diameter of 125 $\mu$m are now in popular use and expected to be an international standard. When optical fibers each having an outer diameter of 125 $\mu$m, or as thick as a hair, to be joined together end to end, the adhesive-passing groove is formed by grooving after the capillary tube has been formed. If this groove has a depth equal to not less than ½ of the inner diameter of the capillary tube, then, at the position where the groove is formed, it is impossible to prevent optical fibers from escaping to the outside of the groove. And the connected end surfaces of the optical fibers do not become parallel but are bent and inclined, or the optical axes are off-centered and in this state the optical fibers are butted against each other, thus increasing connection loss. However, this can be prevented by making the depth of the groove equal to less than ½ of the inner diameter of the capillary tube.

Since the protective glass tube has received no processing which will cause stress concentration, it protects the capillary tube without decreasing the glass strength. And since its inner diameter is greater than the outer diameter of the capillary tube and the capillary tube is deviated to the side opposite to the groove and joined thereto, the formation of a clearance for escapement of air and adhesive agent discharged through the adhesive-passing groove in the middle portion of the capillary tube is facilitated.

Since the protective glass and capillary tube are made of ultraviolet-transmitting glass, optical fiber connection can be made simply and quickly by filling an ultraviolet-curing type adhesive agent therein and irradiating them by an ultraviolet lamp.

If said adhesive is charged into the protective glass tube in advance and the whole is wrapped in a light-screening packaging material, optical fiber connection can be made soon after the package is unwrapped in the field; thus, it is possible to prevent entry of dust and foreign matter into the adhesive agent, a phenomenon which is liable to occur when an adhesive agent is injected at a site of poor job environment.

Further, for optical fibers whose coats have a small outer diameter, an adapter tube may be used, whereby connection can be made in the same manner.

BEST MODE FOR CARRYING OUT THE INVENTION

Figure 1:
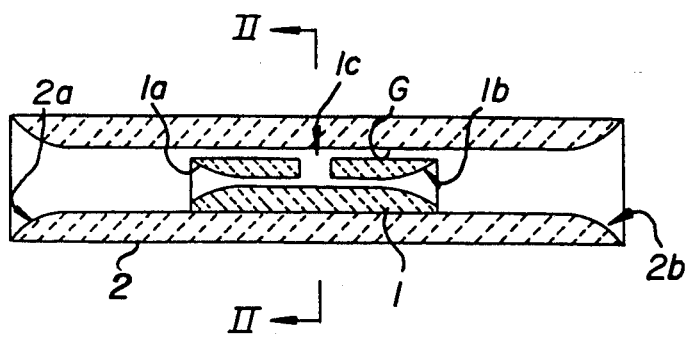
FIG. 1 is a longitudinal sectional view of a permanent connector for optical fibers.
Figure 2:
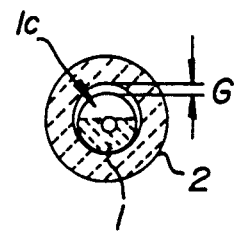
FIG. 2 is a sectional view taken along II-II.

In the attached drawings, 1 denotes a capillary tube; 2 denotes a protective glass tube; 3 and 4 denote optical fibers; and 5 denotes an adapter tube.

The capillary tube 1 has an inner diameter slightly greater than the outer diameter of the clads 3a and 4a of the optical fibers 3 and 4, e.g., an inner diameter which is about $1\mu$ greater than a clad outer diameter which is $125\mu$, and an outer diameter substantially equal to the outer diameter e.g., $250\mu$) of the optical fibers. The capillary tube is made of ultraviolet ray-transmitting glass, e.g., borosilicate glass into a cylinder of uniform thickness having tapered portions 1a and 1b at the opposite ends and a adhesive-passing groove 1c formed in the middle portion and having a depth which is less than $\frac{1}{2}$ of the inner diameter.

The protective glass tube 2 has an inner diameter slightly greater (by several $\mu$m-tens of $\mu$m) than the outer diameter of the capillary tube 1 It is made of ultraviolet-transmitting glass similar to that for the capillary tube 1 into a cylinder of uniform wall thickness (a wall thickness corresponding to a required strength). It is greater in length than the capillary tube 1; for example, it is about three times as long as the capillary tube 1 and is chamfered at the opposite ends of the inner diameter to provide tapered portions 2a and 2b.

In the middle portion of the protective glass tube 2, the capillary tube 1 is eccentrically joined thereto to form a clearance G between the outer diameter of the capillary tube 1 and the inner diameter of the protective glass tube 2. The off-centering direction is opposite to the position of formation of the adhesive-passing groove 1c in the capillary tube, thereby bringing the adhesive-passing groove into communication with the clearance G.

The capillary tube 1 and the protective glass tube 2 are joined together along a line contact region between the two tubes 1 and 2; thus, the use of an ultraviolet-transmitting adhesive agent is desirable, but other adhesive agents may be used.

As for the basic construction of the optical fibers 3 and 4, they are each composed of a passage for optical signals called a core and a clad 3a, 3b concentrically surrounding the core. Since the reflectivity of the cores is about 1% greater than that of the clads 3a and 4a, there is no possibility of an optical signal escaping to the outside through the clads 3a and 4a. Coats 3b and 4b are formed on the clads 3a and 4a.

Figure 3:
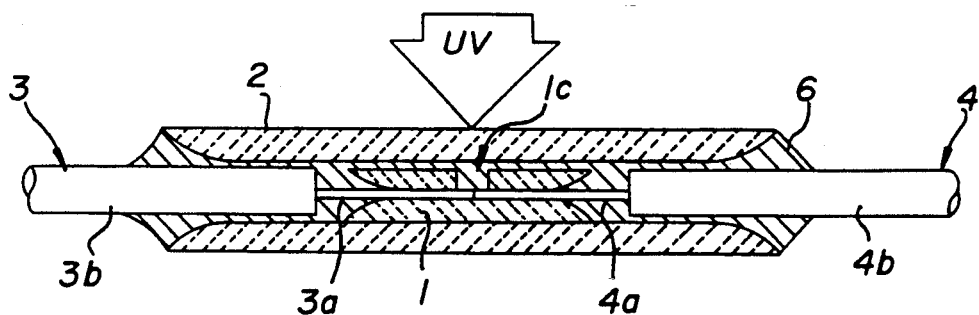
FIG. 3 is a longitudinal sectional view, showing an optical fiber connecting operation.

The operation of connecting the optical fibers 3 and 4 comprises the steps of stripping predetermined lengths or more of the coats 3b and 4b, wiping the surfaces of the clads 3a and 4a and cutting them to a predetermined length suited to the length of the capillary tube 1 by a optical fiber cutting machine (not shown). An ultraviolet-curing type adhesive agent 6 is injected into the protective glass tube 2 in advance. This adhesive agent has a reflectivity which is nearly equal to that of the light transmitting portions of the optical fibers and has high environmental durability. And, as shown in FIG. 3, the optical fibers 3 and 4 are inserted into the protective glass tube 2 through the opposite ends of the latter until the clads 3a and 4a are butted against each other, whereupon ultraviolet rays UV are radiated to cure the adhesive agent 6.

Figure 4:
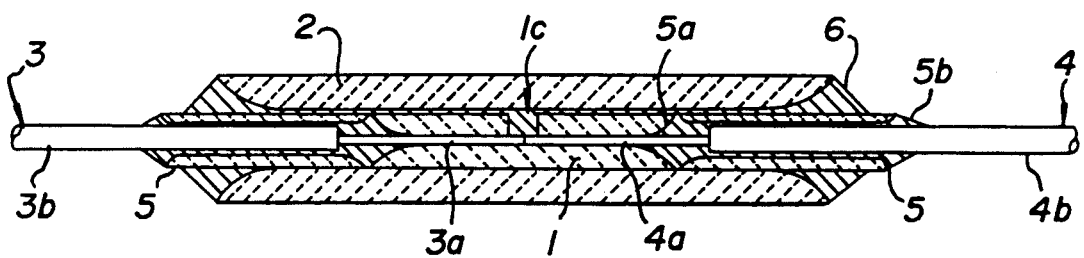
FIG. 4 is a longitudinal sectional view showing another embodiment of a permanent connector according to the invention.

FIG. 4 shows the use of adapter tubes 5 in permanently connecting optical fibers 3 and 4 whose coats 3b and 4b have an outer diameter considerably smaller than the outer diameter of the capillary tube 1

The adapter tubes 5 have an outer diameter slightly smaller than the inner diameter of the protective glass tube 2 and an inner diameter slightly larger than the outer diameter of the coats 3b and 4b and tapered portions 5a and 5b at the opposite ends of the inner diameter, said adapter tubes being made of the same glass material as that of the capillary tube 1.

When it is desired to use the adapter tubes 5, a predetermined amount of adhesive agent 6 is injected into the protective glass tube 2. The adapter tubes 5 may be inserted in advance or after the optical fibers 3 and 4 have been inserted. Ultraviolet rays UV are then radiated to cure the adhesive agent 6.

If said adhesive agent 6 is injected into the protective glass tube 2 in advance and the whole is wrapped in a light screening packaging material, connection of the optical fibers 3 and 4 can be made soon after the package is unwrapped in the field; thus, it is possible to prevent entry of dust and the like into the adhesive agent 6 can be prevented, a phenomenon which is liable to occur when an adhesive agent is injected at a site of poor job environment.

Further, a portable ultraviolet lamp can be used as the means for radiating ultraviolet rays UV.

According to the invention, optical fibers can be permanently connected together simply and quickly in a short time using an ultraviolet-curing type adhesive agent and an ultraviolet lamp.

Particularly, the centering of optical fibers at their butt end can be effected with high accuracy by forming a high precision glass capillary tube with an adhesive-passing groove to a depth of less than $\frac{1}{2}$ of the inner diameter; thus, it is possible to use a reliable adhesive agent in a glass capillary tube with the clearance between it and optical fibers being minimized. It is possible to increase the reliability and butting precision of the permanent connector while decreasing connection loss to about 0.2 dB.

Further, since the protective glass tube has received no processing which causes stress concentration, the glass strength is not decreased, and because of the formation of the clearance between the protective glass tube and the capillary tube, a passage for the adhesive agent is obtained to reduce the resistance to insertion of optical fibers, preventing air from remaining in the form of bubbles.

Connection of optical fibers can be made using inexpensive tools such as a portable ultraviolet source, an optical fiber connection end finishing tool and a connecting jig and at a connection loss of only 0.2 dB and at an explosion-protected site or narrow job site in such applications as emergency connection, temporary connection and the like.

By injecting a adhesive agent into the protective glass tube in advance and wrapping the whole in a light screening packaging material, preservation is attained and connection of optical fibers can be made soon after the package is unwrapped in the field, making it possible to prevent entry of dust and the like into the adhesive agent during injection of the adhesive agent at a site of poor job environment.

For optical fibers whose coats have a small diameter, the permanent connector can be used in the same manner by using adapter tubes.

What is claimed is:

1. A permanent connector for optical fibers characterized by comprising a capillary tube made of ultraviolet-transmitting glass which has an accurately produced inner diameter slightly greater than the outer diameter of the clads of optical fibers, tapered portions on the opposite ends of the inner diameter, and an adhesive-passing groove formed in the middle portion and having a depth which is not more than ½ of the inner diameter, and an ultraviolet-transmitting protective glass tube which has an inner diameter greater than the outer diameter of the capillary tube and to which the capillary tube is eccentrically joined in said inner diameter on the side opposite to the adhesive-passing groove to define a clearance between said inner diameter and the outer diameter of the capillary tube on the side where the adhesive-passing groove is formed.

2. A permanent connector for optical fibers as set forth in claim 1, characterized by having an ultraviolet-curing type adhesive agent injected into the permanent connector for optical fibers, the whole being wrapped in a light screening packaging material.

3. A permanent connector for optical fibers as set forth in claim 1 or 2, characterized by incorporating an adapter tube made of ultraviolet-transmitting glass adapted to be applied to optical fibers whose coats have a small outer diameter, said adapter tube having an outer diameter slightly smaller than the inner diameter of the protective glass tube and an inner diameter slightly greater than the outer diameter of the coats of optical fibers, said adapter tube having tapered portions on the opposite ends of said inner diameter.

* * * * *